United States Patent
Li et al.

(10) Patent No.: US 10,785,776 B2
(45) Date of Patent: Sep. 22, 2020

(54) METHOD FOR PROCESSING CHANNEL COLLISIONS IN DIRECT MODE OPERATION MODE, AND TERMINAL

(71) Applicant: HYTERA COMMUNICATIONS CORP., LTD., Shenzhen, Guangdong (CN)

(72) Inventors: Huadong Li, Shenzhen (CN); Zhibing Lu, Shenzhen (CN)

(73) Assignee: Hytera Communications Corporation Limited, Guangdong (CN)

( * ) Notice: Subject to any disclaimer, the term of this patent is extended or adjusted under 35 U.S.C. 154(b) by 103 days.

(21) Appl. No.: 15/761,537

(22) PCT Filed: May 25, 2016

(86) PCT No.: PCT/CN2016/083304
§ 371 (c)(1),
(2) Date: Oct. 29, 2018

(87) PCT Pub. No.: WO2017/049938
PCT Pub. Date: Mar. 30, 2017

(65) Prior Publication Data
US 2019/0098617 A1    Mar. 28, 2019

(30) Foreign Application Priority Data
Sep. 21, 2015    (CN) .......................... 2015 1 0605345

(51) Int. Cl.
*H04W 72/04*    (2009.01)
*H04W 72/12*    (2009.01)
(Continued)

(52) U.S. Cl.
CPC ....... *H04W 72/048* (2013.01); *H04L 67/1074* (2013.01); *H04W 4/06* (2013.01);
(Continued)

(58) Field of Classification Search
CPC ............... H04W 72/12; H04W 72/048; H04W 72/0446; H04W 72/005; H04W 74/008;
(Continued)

(56) References Cited

U.S. PATENT DOCUMENTS

2014/0301307 A1    10/2014  Lee et al.
2018/0206211 A1*   7/2018   Seo ........................ H04W 72/02

FOREIGN PATENT DOCUMENTS

| CN | 103068049 A    | 4/2013  |
| CN | 104303579 A    | 1/2015  |
| WO | 2014166516 A1  | 10/2014 |

OTHER PUBLICATIONS

International Search Report from PCT/CN2016/083304 dated Jul. 19, 2016.
(Continued)

*Primary Examiner* — Jianye Wu
(74) *Attorney, Agent, or Firm* — Calfee, Halter & Griswold LLP (57) ABSTRACT

The embodiments of the present invention disclose a method for processing channel collisions in direct mode operation and a terminal, which can ensure correct transmission of service data and improve user experience. The method in the embodiments of the present invention includes: receiving, by a first terminal, first SCI sent by a second terminal and second SCI sent by a third terminal, and detecting whether a channel collision occurs between the second terminal and the third terminal according to the first SCI and the second SCI; and if a channel collision occurs between the second terminal and the third terminal, generating, by the first terminal, a channel collision message and sending the channel collision message, so that the second terminal and the third terminal can resend the service data according to the channel collision message. The embodiment of the invention also discloses a terminal. The embodiments of the present
(Continued)

invention can ensure the correct transmission of the service data and improve user experience.

17 Claims, 5 Drawing Sheets

(51) Int. Cl.
| | |
|---|---|
| H04W 74/08 | (2009.01) |
| H04L 29/08 | (2006.01) |
| H04W 4/06 | (2009.01) |
| H04W 72/00 | (2009.01) |
| H04W 74/00 | (2009.01) |
| H04W 76/14 | (2018.01) |
| H04L 5/00 | (2006.01) |

(52) U.S. Cl.
CPC ..... *H04W 72/005* (2013.01); *H04W 72/0446* (2013.01); *H04W 72/12* (2013.01); *H04W 74/008* (2013.01); *H04W 74/0816* (2013.01); *H04W 74/0858* (2013.01); *H04L 5/0007* (2013.01); *H04W 76/14* (2018.02)

(58) Field of Classification Search
CPC ......... H04W 74/0816; H04W 74/0858; H04W 76/14; H04W 4/06; H04L 5/0007; H04L 67/1074
See application file for complete search history.

(56) References Cited

OTHER PUBLICATIONS

European Search Report from European Application No. 16847820.4 dated Sep. 17, 2018.
Intel Corporation "Handling of UE-to-NW Relay Concurrent Processes" 3GPP TSG Ran WG Meeting #82, R-1154586+, Aug. 2015.
First Office Action for Chinese Patent Application No. 201510605345.4 dated Mar. 12, 2019.

\* cited by examiner

METHOD FOR PROCESSING CHANNEL COLLISIONS IN DIRECT MODE OPERATION MODE, AND TERMINAL

This application claims the priority to Chinese Patent Application No. 201510605345.4 filed by State Intellectual Property Office of the P.R. China on Sep. 21, 2015, and titled "Method for Processing Channel Collisions in Direct Mode Operation and Terminal", the entire contents of which are incorporated herein by reference.

TECHNICAL FIELD

The present invention relates to the field of wireless communications, and more particularly, to a method for processing channel collisions in direct mode operation and a terminal.

BACKGROUND

In a digital trunking system, direct mode operation (Direct Mode Operation, DMO) refers to a communication technology that direct communication occurs between terminals without cellular network coverage.

Currently, the Device-to-Device (Device-to-Device, D2D) Standard of the 3rd Generation Partnership Project (3rd Generation Partnership Project, 3GPP) specifies that the terminal can randomly select time-frequency resources to send information in the DMO. As the wideband trunking DMO technology is not yet mature, the channel collision processing technology in the DMO is still in a research stage.

In practical applications, time-frequency resources used for direct mode operation are limited. Since no base station schedules the time-frequency resources, when there are a large number of terminals within a certain scope, different terminals may select the same time-frequency resource for communication, and a channel collision may occur at this time, causing the terminals to fail to receive service data correctly, which affects user experience.

SUMMARY

In light of this, the embodiments of the present invention provide a method for processing channel collisions in direct mode operation and a terminal, which can ensure correct transmission of the service data and improve user experience.

According to a first aspect of the present invention, there is provided a method for processing channel collisions in direct mode operation, comprising:

receiving, by a first terminal, first sidelink control information SCI sent by a second terminal and second SCI sent by a third terminal;

detecting, by the first terminal, whether a channel collision occurs between the second terminal and the third terminal according to the first SCI and the second SCI; and if a channel collision occurs between the second terminal and the third terminal, generating, by the first terminal, a channel collision message and sending the channel collision message, so that the second terminal and the third terminal can resend the service data according to the channel collision message.

With reference to the first aspect of the present invention, in a first implementation manner of the first aspect of the present invention, the detecting, by the first terminal, whether a channel collision occurs between the second terminal and the third terminal according to the first SCI and the second SCI comprises:

determining, by the first terminal, whether physical sidelink shared channels PSSCHs are in the same transmission time interval TTI according to the resource location indication of the first SCI and the resource location indication of the second SCI, and determining that a channel collision occurs between the second terminal and the third terminal if the PSSCHs are in the same transmission time interval TTI, wherein the first terminal, the second terminal and the third terminal belong to the same communication session group.

With reference to the first aspect of the present invention, in a second implementation manner of the first aspect of the present invention, the detecting, by the first terminal, whether a channel collision occurs between the second terminal and the third terminal according to the first SCI and the second SCI comprises:

determining, by the first terminal, whether PSSCHs occupy the same time-frequency resources according to the resource location indication of the first SCI and the resource location indication of the second SCI, and determining that a channel collision occurs between the second terminal and the third terminal if the PSSCHs occupy the same time-frequency resources, wherein the first terminal and the second terminal belong to the same communication session group, and the first terminal and the third terminal belong to different communication session groups.

With reference to the second implementation manner of the first aspect of the present invention, in a third implementation manner of the first aspect of the present invention, the method further comprises:

receiving, by the first terminal, service data sent by the second terminal;

after the determining, by the first terminal that a channel collision occurs between the second terminal and the third terminal, the method comprises:

steps of determining, by the first terminal, whether the service data is correct, and triggering the first terminal to generate a channel collision message if the service data is incorrect.

With reference to the first aspect of the present invention, or the first implementation manner of the first aspect of the present invention, or the second implementation manner of the first aspect of the present invention, or the third implementation manner of the first aspect of the present invention, in a fourth implementation manner of the first aspect of the present invention, the sending, by the first terminal, the channel collision message comprises:

sending, by the first terminal, the channel collision message in a broadcast manner, the channel collision message including a second terminal identification and a third terminal identification; and/or, sending, by the first terminal, the channel collision message to the second terminal and the third terminal respectively in a point to point P2P manner.

According to a second aspect of the present invention, there is provided a method for processing channel collisions in direct mode operation, comprising:

sending, by a second terminal, service data and first sidelink control information SCI, so that a first terminal can receive the first SCI, and detect whether a channel collision occurs between the second terminal and the third terminal according to the first SCI;

receiving, by the second terminal, a channel collision message sent by the first terminal; and resending, by the second terminal, the service data according to the channel collision message.

With reference to the second aspect of the present invention, in a first implementation manner of the second aspect of the present invention, after the receiving, by the second terminal, the channel collision message sent by the first terminal, the method further comprises:

the steps of determining, by the second terminal, whether a channel collision occurs between the second terminal and the third terminal according to the channel collision message, and triggering the second terminal to resend the service data according to the channel collision message if the channel collision occurs.

With reference to the second aspect of the present invention, in a second implementation manner of the second aspect of the present invention, after the receiving, by the second terminal, the channel collision message sent by the first terminal, the method further comprises:

determining, by the second terminal, whether the second terminal satisfies a pause condition, and acquiring a pause duration if the second terminal satisfies the pause condition, and starting timing from receiving the channel collision message; when the timing reaches the pause duration, triggering the second terminal to resend the service data according to the channel collision message, and triggering the second terminal to resend service data according to the channel collision message if the second terminal does not satisfy the pause condition.

With reference to the second implementation manner of second aspect of the present invention, in a third implementation manner of the second aspect of the present invention, the determining, by the second terminal, whether the second terminal satisfies the pause condition comprises:

determining, by the second terminal, whether a priority of the second terminal is lower than a preset priority, and determining that the second terminal satisfies the pause condition if the priority of the second terminal is lower than the preset priority.

With reference to the second implementation manner of the second aspect of the present invention, or the third implementation manner of the second aspect of the present invention, in a fourth implementation manner of the second aspect of the present invention, the acquiring, by the second terminal, a pause duration comprises: acquiring, by the second terminal, the pause duration according to a random algorithm; or, acquiring, by the second terminal, the pause duration according to the priority of the terminal.

According to a third aspect of the present invention, there is provided a terminal, wherein the terminal serves as a first terminal, and the terminal comprises:

a receiving module, configured to receive first sidelink control information SCI sent by a second terminal and second SCI sent by a third terminal;

a detection module, configured to detect whether a channel collision occurs between the second terminal and the third terminal according to the first SCI and the second SCI;

a generating module, configured to generate a channel collision message if a channel collision occurs between the second terminal and the third terminal; and a sending module, configured to send the channel collision message, so that the second terminal and the third terminal can resend the service data according to the channel collision message.

According to a fourth aspect of the present invention, there is provided a terminal, wherein the terminal serves as a second terminal, and the terminal comprises:

a sending module, configured to send service data and send first sidelink control information SCI, so that a first terminal can receive the first SCI, and detect whether a channel collision occurs between the second terminal and a third terminal according to the first SCI; and a receiving module, configured to receive a channel collision message sent by the first terminal;

wherein, the sending module is further configured to resend the service data according to the channel collision message.

According to a fifth aspect of the present invention, there is provided a terminal, wherein the terminal serves as a first terminal, and the terminal comprises:

a receiving apparatus, a sending device, a processor and a memory;

the receiving module is configured to receive first sidelink control information SCI sent by a second terminal and second SCI sent by a third terminal;

the processor is configured to detect whether a channel collision occurs between the second terminal and the third terminal according to the first SCI and the second SCI;

the processor is further configured to generate a channel collision message if a channel collision occurs between the second terminal and the third terminal; and the sending apparatus is configured to send the channel collision message, so that the second terminal and the third terminal can resend the service data according to the channel collision message.

With reference to the fifth aspect of the present invention, in a first implementation manner of the fifth aspect of the present invention, the processor is specifically configured to determine whether physical sidelink shared channels PSSCHs are in the same transmission time interval TTI according to the resource location indication of the first SCI and the resource location indication of the second SCI, and determine that a channel collision occurs between the second terminal and the third terminal if the PSSCHs are in the same transmission time interval TTI, wherein the first terminal, the second terminal and the third terminal belong to the same communication session group.

With reference to the fifth aspect of the present invention, in a second implementation manner of the fifth aspect of the present invention, the processor is specifically configured to determine whether PSSCHs occupy the same time-frequency resources according to the resource location indication of the first SCI and the resource location indication of the second SCI, and determine that a channel collision occurs between the second terminal and the third terminal if the PSSCHs occupy the same time-frequency resources, wherein the first terminal and the second terminal belong to the same communication session group, and the first terminal and the third terminal belong to different communication session groups.

With reference to the second implementation manner of the fifth aspect of the present invention, in a third implementation manner of the fifth aspect of the present invention, the receiving apparatus is configured to receive service data sent by the second terminal; and the processor is specifically configured to the steps of determining whether the service data is correct, after the processor determines that a channel collision occurs between the second terminal and the third terminal and triggering the processor to generate a channel collision message if the service data is incorrect.

With reference to the fifth aspect of the present invention, or the first implementation manner of the fifth aspect of the present invention, or the second implementation manner of the fifth aspect of the present invention, or the third implementation manner of the fifth aspect of the present invention, in a fourth implementation manner of the fifth aspect of the present invention, the sending apparatus is specifically configured to send the channel collision message in a broadcast manner, the channel collision message including a second terminal identification and a third terminal identification; and/or, the sending apparatus is specifically configured to send the channel collision message to the second terminal and the third terminal respectively in a point to point P2P manner.

According to a sixth aspect of the present invention, there is provided a terminal, wherein the terminal serves as a second terminal, and the terminal comprises:

a receiving apparatus, a sending device, a processor and a memory;

the sending apparatus is configured to send service data and send first sidelink control information SCI, so that a first terminal can receive the first SCI, and detect whether a channel collision occurs between the second terminal and a third terminal according to the first SCI;

the receiving apparatus is configured to receive a channel collision message sent by the first terminal; and the sending apparatus is further configured to resend the service data according to the channel collision message.

With reference to the sixth aspect of the present invention, in a first implementation manner of the sixth aspect of the present invention, the processor is further configured to the steps of determining whether a channel collision occurs between the second terminal and the third terminal according to the channel collision message, and triggering the sending apparatus to resend the service data according to the channel collision message if the channel collision occurs.

With reference to the sixth aspect of the present invention, in a second implementation manner of the sixth aspect of the present invention, the processor is further configured to the steps of determining whether the second terminal satisfies a pause condition, and triggering the processor to acquire a pause duration if the second terminal satisfies the pause condition, and starting timing from receiving the channel collision message; when the timing reaches the pause duration, triggering the second terminal to resend the service data according to the channel collision message, and triggering the second terminal to resend the service data according to the channel collision message if the second terminal does not satisfy the pause condition; and the processor is further configured to acquire the pause duration and start timing from receiving the channel collision message.

With reference to the second implementation manner of the sixth aspect of the present invention, in a third implementation manner of the sixth aspect of the present invention, the processor is specifically configured to determine whether a priority of the second terminal is lower than a preset priority, and determine that the second terminal satisfies the pause condition if the priority of the second terminal is lower than the preset priority.

With reference to the second implementation manner of the sixth aspect of the present invention, or the third implementation manner of the sixth aspect of the present invention, in a fourth implementation manner of the sixth aspect of the present invention, the processor is specifically configured to acquire a pause duration according to a random algorithm; or, the processor is specifically configured to acquire the pause duration according to the priority of the terminal.

It can be seen from the above technical solutions that the embodiments of the present invention have the following advantages:

in the embodiment of the present invention, the first terminal receives the first sidelink control information (Sidelink Control Information, SCI) sent by the second terminal, and the second SCI sent by the third terminal, and detects whether a channel collision occurs between the third terminal and the third terminal according to the first SCI and the second SCI; if a channel collision occurs between the second terminal and the third terminal, the first terminal generates a channel collision message and sends the channel collision message; the second terminal and the third terminal resend the service data according to the channel collision message. When the service data cannot be normally received and sent due to the channel collision occurring between the terminals, the present invention monitors the SCI through other terminals and feeds back a channel collision message. The terminal that encounters the channel collision can resend data according to the channel collision message, which reduces the probability that different terminals send service data at the same time, ensures correct transmission of the service data, and improves user experience.

DETAILED DESCRIPTION

The following clearly and completely describes the technical solutions in the embodiments of the invention with reference to the accompanying drawings in the embodiments of the invention. Apparently, the described embodiments are merely some but not all of the embodiments of the invention. Based on the embodiments of the present invention, all other embodiments obtained by those skilled in the art without going through any creative work shall fall within the scope of protection of the invention.

Figure 1:
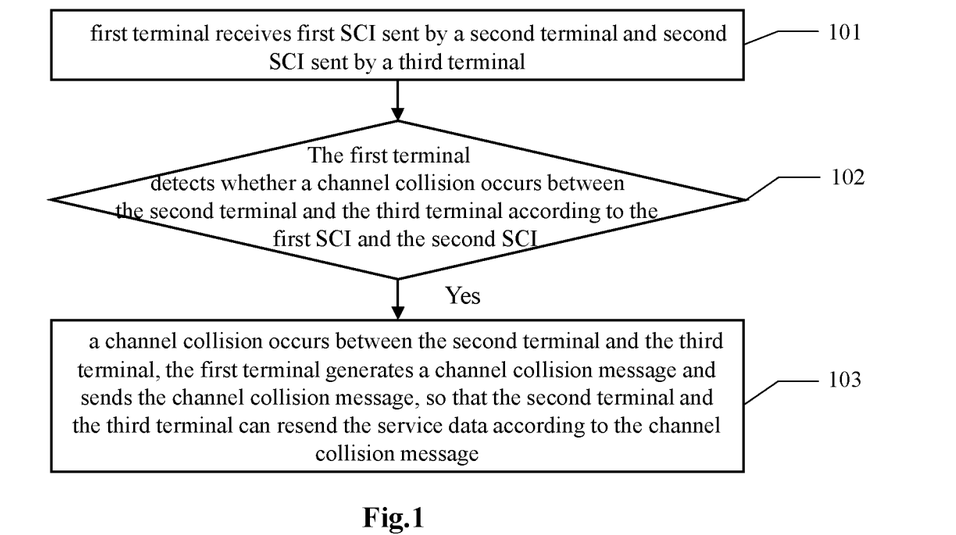
FIG. 1 is a flow diagram of a method for processing channel collisions in direct mode operation according to an embodiment of the present invention.

Referring to FIG. 1, an embodiment of a method for processing channel collisions in direct mode operation according to the embodiments of the present invention comprises the following steps.

In step 101, a first terminal receives first SCI sent by a second terminal and second SCI sent by a third terminal.

In the embodiment, the second terminal sends the first SCI when sending the service data and the third terminal sends the second SCI when sending the service data in the DMO, the first terminal can receive the first SCI sent by the second terminal and the second SCI sent by the third terminal. The SCI is control information in DMO communications, and a format thereof is generally SCI0. In practical applications, the format thereof can also be extended to other formats, which are not specifically limited herein.

It should be noted that, the service data sent by the second terminal and the third terminal may be the same or different, and the second terminal or the third terminal may send the service data for a specific object or may broadcast the service data within the group without targeting one or several specific objects, and will not be elaborated herein.

In step 102, the first terminal detects whether a channel collision occurs between the second terminal and the third terminal according to the first SCI and the second SCI, and step 103 is executed if a channel collision occurs between the second terminal and the third terminal.

The SCI comprises time-frequency information when the terminal sends the service data, the first terminal can determine time-frequency information occupied by the second terminal when sending the service data according to the first SCI, and can also determine time-frequency information occupied by the third terminal when sending the service data according to the second SCI, and determine whether a channel collision occurs between the second terminal and the third terminal by comparing the time-frequency information; if a channel collision occurs between the second terminal and the third terminal, then step 103 is executed; otherwise, the second terminal and the third terminal are not necessary to resend the service data.

In step 103, if a channel collision occurs between the second terminal and the third terminal, the first terminal generates a channel collision message and sends the channel collision message, so that the second terminal and the third terminal can resend the service data according to the channel collision message.

If a channel collision occurs between the second terminal and the third terminal, then the first terminal can generate the channel collision message and send the channel collision message, and the second terminal and the third terminal can resend the service data according to the channel collision message.

It should be noted that the second terminal and the third terminal can resend the service data via a plurality of methods to solve the channel collision, for instance, the second terminal and the third terminal respectively pause for a period of time; because the second terminal and the third terminal respectively select a time to resend the service data, the probability that the second terminal and the third terminal send the service data at the same time is greatly reduced, thus ensuring that the terminal is capable of correctly sending the service data to a corresponding terminal for receiving services. The second terminal and the third terminal may also resend data through other methods. Reference may be made to the following embodiments for details.

Figure 2:
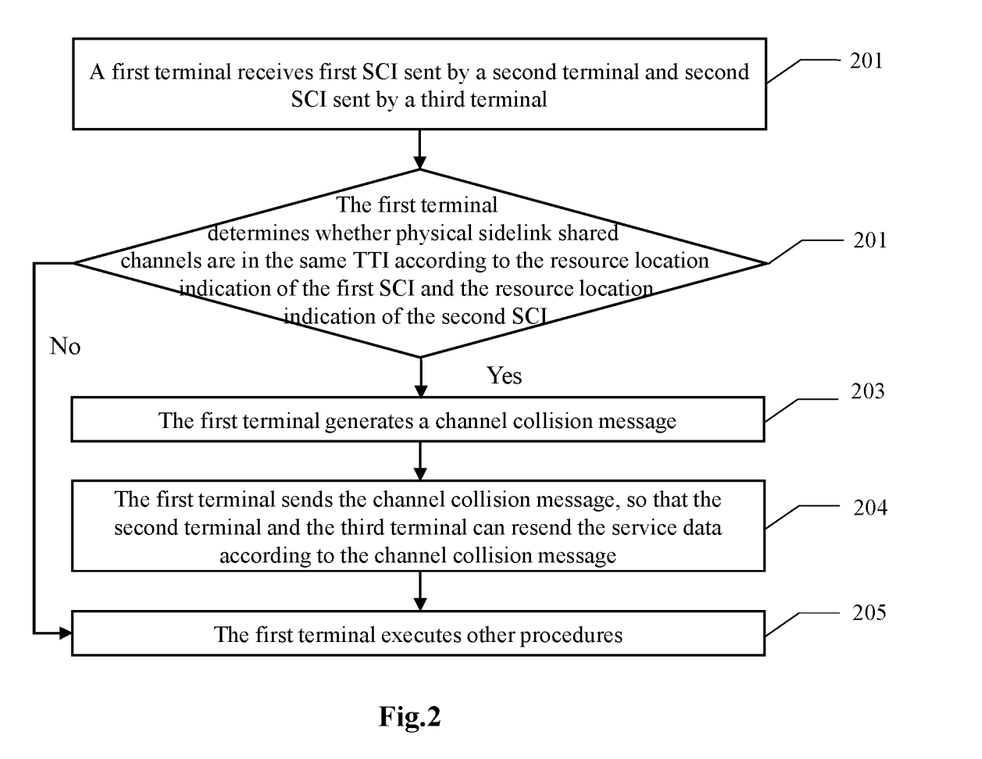
FIG. 2 is another flow diagram of a method for processing channel collisions in direct mode operation according to an embodiment of the present invention.

The following describes the processing method according to the present invention when a channel collision occurs in different scenarios:

I. Channel Collision within a Group:

The method for processing channel collisions in a communication session group is described below from a first terminal side. Referring to FIG. 2, another embodiment of a method for processing channel collisions in direct mode operation according to the embodiments of the present invention comprises the following steps.

In step 201, a first terminal receives first SCI sent by a second terminal and second SCI sent by a third terminal.

In this embodiment, in the DMO, the first terminal, the second terminal, and the third terminal belong to the same communication session group. When the second terminal sends service data and sends the first SCI in the session group, and the third terminal sends the second SCI in the session group when sending service data, the first terminal may receive the first SCI and the second SCI. The SCI is control information in DMO communications, and a format thereof is generally SCI0. In practical applications, the format thereof can also be extended to other formats, which are not specifically limited herein. It can be understood that the first terminal can be any terminal in the communication session group.

In step 202, the first terminal determines whether physical sidelink shared channels (Physical Sidelink Shared Channel, PSSCH) are in the same TTI according to the resource location indication of the first SCI and the resource location indication of the second SCI; step 203 is executed if the PSSCHs occupy the same TTI; otherwise, step 205 is executed.

Specifically, the PSSCH is a service data channel in DMO communications and is used to carry the service data. The SCI comprises the resource location indication. The resource location indication is used to indicate the TTI in which the PSSCH transmitting the service data is located in. The first terminal may determine the transmission time interval (Transmission Time Interval, TTI) in which the second terminal sends the service information according to the first SCI, for example, an $x^{th}$ TTI, and similarly, the first terminal can determine the TTI in which the third terminal sends the service information according to the second SCI, for example, a $y^{th}$ TTI. If x=y, it indicates that the second terminal and the third terminal use the same TTI to send data, i.e., send the service data in the communication session group at the same time. At this time, neither the second terminal nor the third terminal can send the service data to a corresponding terminal for receiving the service data correctly, that is, the channel collision occurs, and step 203 is executed. If x≠y, it indicates that the TTIs for the second terminal and the third terminal to send service data are different, and it is not necessary to execute a channel collision processing procedure, and step 205 is executed.

In step 203, the first terminal generates a channel collision message.

When the first terminal detects that a channel collision occurs between the second terminal and the third terminal, the first terminal may generate a channel collision message.

In step 204, the first terminal sends the channel collision message, so that the second terminal and the third terminal can resend the service data according to the channel collision message.

The first terminal may send the channel collision message in multiple ways. Reference may be made to the following embodiments for details.

Optionally, in some embodiments of the present invention, the first terminal may send the channel collision message specifically in the following manner: the first terminal sends the channel collision message in a broadcast manner, the channel collision message comprising a second terminal identification and a third terminal identification.

Specifically, the channel collision message comprises the second terminal identification and the third terminal identification. After receiving the channel collision message, the second terminal may determine that a channel collision occurs between the service data sent by the second terminal and the third terminal according to the second terminal identification; the service data is not sent correctly, and the service data is resent to the corresponding terminal for receiving service data. The third terminal is similar to the second terminal and will not be elaborated herein.

It should be noted that the channel collision message comprises the identification of the terminal in which the channel collision occurs, and may include other terminal identifications in addition to the second terminal identification and the third terminal identification, for example, a collision occurs among the second terminal, the third terminal, and a fourth terminal, the channel collision message comprises the second terminal identification, the third terminal identification, and a fourth terminal identification, so that the terminals having channel collision can resend the service data according to the channel collision message, while the terminals without channel collision, after receiving the service collision message, can ignore the channel collision message or forward the channel collision message since there are no corresponding terminal identifications. A specific implementation method is not limited herein.

It should be noted that the number of times that the first terminal broadcasts the channel collision message may be one, two or other values, and is set to be a relatively small value by the actual situation, so as to avoid the channel collision message being sent by multiple terminals in an avalanche manner. The specific number of times is not limited.

Optionally, in some embodiments of the present invention, the first terminal may send the channel collision message specifically in the following manner: the first terminal sends the channel collision message to the second terminal and the third terminal respectively in a point to point (Point to Point, P2P) manner.

To be specific, the first terminal can send the channel collision message to the second terminal and the third terminal respectively in a P2P manner, and then the second terminal and the third terminal respectively resend the service data after receiving the channel collision message. It can be understood that other terminals in the communication session group will not receive the channel collision message at this time.

In step 205, the first terminal executes other procedures.

If the channel collision does not occur between the second terminal and the third terminal, it indicates that the second terminal and the third terminal can correctly send the service data without executing a channel collision processing procedure, and the first terminal can continue to monitor the SCI sent by the second terminal and the third terminal at intervals, or execute other procedures, which are not limited herein.

In this embodiment, the first terminal can monitor the SCI and feed back a channel collision message to the second terminal and the third terminal. The second terminal and the third terminal can resend the service data according to the channel collision message, which solves the problem that the second terminal and the third terminal cannot send the service data correctly when a channel collision occurs, and improves user experience.

Figure 3:
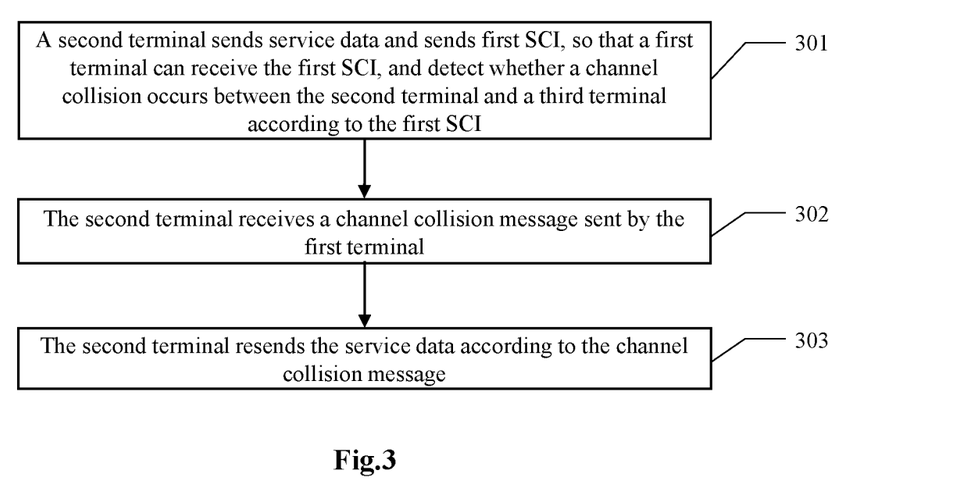
FIG. 3 is another flow diagram of a method for processing channel collisions in direct mode operation according to an embodiment of the present invention.

The method for processing channel collisions in a session group is described below from a second terminal side. Referring to FIG. 3, another embodiment of a method for processing channel collisions in direct mode operation according to the embodiments of the present invention comprises the following steps.

In step 301, a second terminal sends service data and sends first SCI, so that a first terminal can receive the first SCI, and detect whether a channel collision occurs between the second terminal and a third terminal according to the first SCI.

In this embodiment, in the DMO, the first terminal, the second terminal, and the third terminal belong to the same communication session group. The second terminal sends service data and sends the first SCI. The third terminal sends service data and broadcasts the second SCI. The first terminal can detect whether a channel collision occurs between the second terminal and the third terminal according to the first SCI and the second SCI, i.e., determine whether PSSCHs are in the same TTI through the first SCI and the second SCI; if the PSSCHs are in the same TTI, it indicates that a channel collision occurs between the second terminal and the third terminal, and step 302 is executed; otherwise, it indicates that no channel collision occurs between the second terminal and the third terminal, then it is not necessary to execute the channel collision processing procedure.

In step 302, the second terminal receives a channel collision message sent by the first terminal.

When a channel collision occurs between the second terminal and the third terminal, the first terminal sends a channel collision message to the second terminal, and the second terminal can receive the channel collision message sent by the first terminal.

In step 303, the second terminal resends the service data according to the channel collision message.

After receiving the channel collision message, the second terminal resends the service data according to the channel collision message. During practical application, the second terminal and the third terminal can respectively pause for a period of time, and then resend the service data, or, the second terminal pauses for a period of time while the third terminal sends the service data, or the third terminal pauses for a period of time while the second terminal sends the service data, which are not limited herein.

This embodiment provides a specific implementation manner in which the second terminal resends the service data according to the channel collision message when a channel collision occurs in the communication session group, thereby improving the implementing feasibility of the solution.

Optionally, in some embodiments of the present invention, after the second terminal receives the channel collision message sent by the first terminal, the method further comprises: steps of determining, by the second terminal, whether a channel collision occurs between the second terminal and the third terminal according to the channel collision message, and triggering the second terminal to resend the service data according to the channel collision message if the channel collision occurs.

Specifically, after receiving the channel collision message, the second terminal determines whether the channel collision message is directed to the second terminal itself, and if the channel collision message is directed to the second terminal itself, the step of resending, by the second terminal, the service data according to the channel collision message is executed; otherwise, the channel collision message may be ignored, or forwarded, which are not limited herein.

Optionally, in some embodiments of the present invention, after the second terminal receives the channel collision message sent by the first terminal, the method further comprises: steps of determining, by the second terminal, whether the second terminal satisfies a pause condition, and acquiring a pause duration if the second terminal satisfies the pause condition, and starting timing from receiving the channel collision message; when the timing reaches the pause duration, triggering the second terminal to resend the service data according to the channel collision message, and triggering the second terminal to resend service data according to the channel collision message if the second terminal does not satisfy the pause condition.

Specifically, the second terminal can determine whether the second terminal satisfies the pause condition in multiple manners. Reference may be made to the following embodiments for details.

Optionally, in some embodiments of the present invention, the channel collision message comprises a pause indication. The determining, by the second terminal, whether the second terminal satisfies a pause condition comprises: determining, by the second terminal that the second terminal satisfies the pause condition according to the pause indication.

Specifically, the first terminal can acquire priorities of the second terminal and the third terminal, and compare the priorities of the two terminals; if the second terminal has a lower priority, then the channel collision message including the pause indication is sent to the second terminal, and the second terminal pauses according to the pause indication.

Optionally, in some embodiments of the present invention, the method further comprises the step that: the second terminal acquires the priority of the third terminal; then the determining, by the second terminal, whether the second terminal satisfies a pause condition comprises that: the second terminal compare the priority of the second terminal with the priority of the third terminal; if the priority of the second terminal is lower than the priority of the third terminal, then the second terminal is determined to satisfy the pause condition; if the priority of the second terminal is higher than the priority of the third terminal, then the second terminal is determined to not satisfy the pause condition.

It should be noted that if the priorities of the second terminal and the third terminal are the same, the second terminal can decide whether to pause the second terminal through a random algorithm. For example, the second terminal may set a threshold, and the second terminal generates a random number and compares the random number with the preset threshold. If the random number is smaller than the preset threshold, it is determined that the second terminal satisfies the pause condition, if the random number is not smaller than the preset threshold, it is determined that the second terminal does not satisfy the suspension condition. The second terminal may also determine whether to pause the second terminal through other random algorithms, which are not limited herein. It should be noted that, the second terminal may not compare the priorities but determine whether the second terminal satisfies the pause condition through a random algorithm only, and the specific implementation process is not limited herein.

Optionally, in some embodiments of the present invention, the method further comprises the step that: the second terminal acquires a service priority of the second terminal and a service priority of the third terminal; then the determining, by the second terminal, whether the second terminal satisfies a pause condition comprises that: the second terminal compare the service priority of the second terminal with the service priority of the third terminal; if the service priority of the second terminal is lower than the service priority of the third terminal, then the second terminal is determined to satisfy the pause condition; if the service priority of the second terminal is higher than the service priority of the third terminal, then the second terminal is determined to not satisfy the pause condition.

Specifically, the service priority corresponds to the service data sent by the terminal. For example, a priority of alarm information is higher than a priority of call information. When the service priority of the second terminal and the service priority of the third terminal are the same, the second terminal can determine whether to pause the second terminal through a random algorithm. Reference may be made to last embodiment for details, and will not be elaborated herein. It should be noted that, the second terminal may not compare the service priorities but determine whether the second terminal satisfies the pause condition through a random algorithm only, and the specific implementation process is not limited herein.

Optionally, in some embodiments of the present invention, the determining, by the second terminal, whether the second terminal satisfies a pause condition comprises that: the second terminal determines whether the priority of the second terminal is lower than a preset priority, and determines that the second terminal satisfies the pause condition if the priority of the second terminal is lower than the preset priority.

Specifically, the priority of the second terminal is lower than the preset priority, then it indicates that the second terminal has a lower priority and needs to be paused; if the priority of the second terminal is not lower than the preset priority, then it indicates that the second terminal has a higher priority, does not need to pause, and can directly send the service data. When the priority of the second terminal is higher than the preset priority and the priority of the third terminal is lower than the preset priority, the second terminal directly sends the service data, while the third terminal pauses, thereby staggering the time of sending the service data, and avoiding the channel collision.

It can be understood that, in practical applications, the second terminal may also determine through other manners, which cannot be listed one by one, and will not be elaborated herein.

Further, in some embodiments of the present invention, the, acquiring, by the second terminal, a pause duration comprises that: the second terminal acquire the pause duration according to a random algorithm. Specifically, the pause duration may be 1s, 2s or other time values, which are not specifically limited herein.

Or, in some embodiments of the present invention, the second terminal acquires the pause duration according to the priority of the terminal. Specifically, the terminal can set a corresponding pause period according to the priority of the terminal, and the second terminal can obtain the pause duration from the corresponding pause period according to the priority thereof. Similarly, the third terminal can also acquire another pause duration according to the priority. When the priorities of the second terminal and the third terminal are different, the pause time is different, and then the second terminal and the third terminal can resend the service data at different time, thus ensuring correct transmission of the service data.

Optionally, in some embodiments of the present invention, the second terminal may send the channel collision message specifically in the following manner: the second terminal selects an idle frequency point to resend the service data according to the channel collision message.

Specifically, the second terminal may resend the service data by using the idle frequency point to avoid channel collision with the third terminal when sending the service data, so as to ensure the correct transmission of the service data. It should be noted that the second terminal return to an original frequency point after sending the service data.

It should be noted that, when a channel collision occurs between other terminals in the session group, the method for processing channel collisions is similar to the embodiments shown in FIG. 2 or FIG. 3, so that a procedure for processing channel collisions in a fourth terminal or other terminals may be analogized, and will not be elaborated herein.

For ease of understanding, a specific application scenario is used hereinafter to describe the method for processing channel collisions according to the embodiments of the present invention in details.

The terminal 1, the terminal 2 and the terminal 3 all belong to the same communication session group. When the terminal 2 sends a PSSCH1, SCI01 is broadcast. When the terminal 3 sends a PSSCH2, SCI02 is broadcast. The terminal 1 can intercept the SCI01 and the SCI02, determine whether the PSSCH1 and the PSSCH2 are in the same TTI according to the resource location indication of the SCI01 and the resource location indication of the SCI02. Assuming that the PSSCH1 is in a sixth TTI and the PSSCH2 is in an eighth TTI, then it is determined that no channel collision occurs between the terminal 2 and the terminal 3. When both the PSSCH1 and the PSSCH2 are in the sixth TTI, then it is determined that a channel collision occurs between the terminal 2 and the terminal 3, and none of the two terminals can send the service data correctly.

The terminal 1 generates and broadcasts a channel collision message. Taking ERR1 as an example, the terminal 2 and the terminal 3 respectively acquire pause durations T1 and T2 after receiving the ERR1. When the timing reaches T1, the terminal 2 sends service data. When the timing reaches T2, the terminal 3 send service data. By staggering the time of sending service data, the channel collision is resolved and the user experience is improved.

If there is a terminal 4 or other terminal in the session group, the specific procedure of processing channel collisions is similar to the processing procedure of the terminal 1, which will not be elaborated herein.

Figure 4:
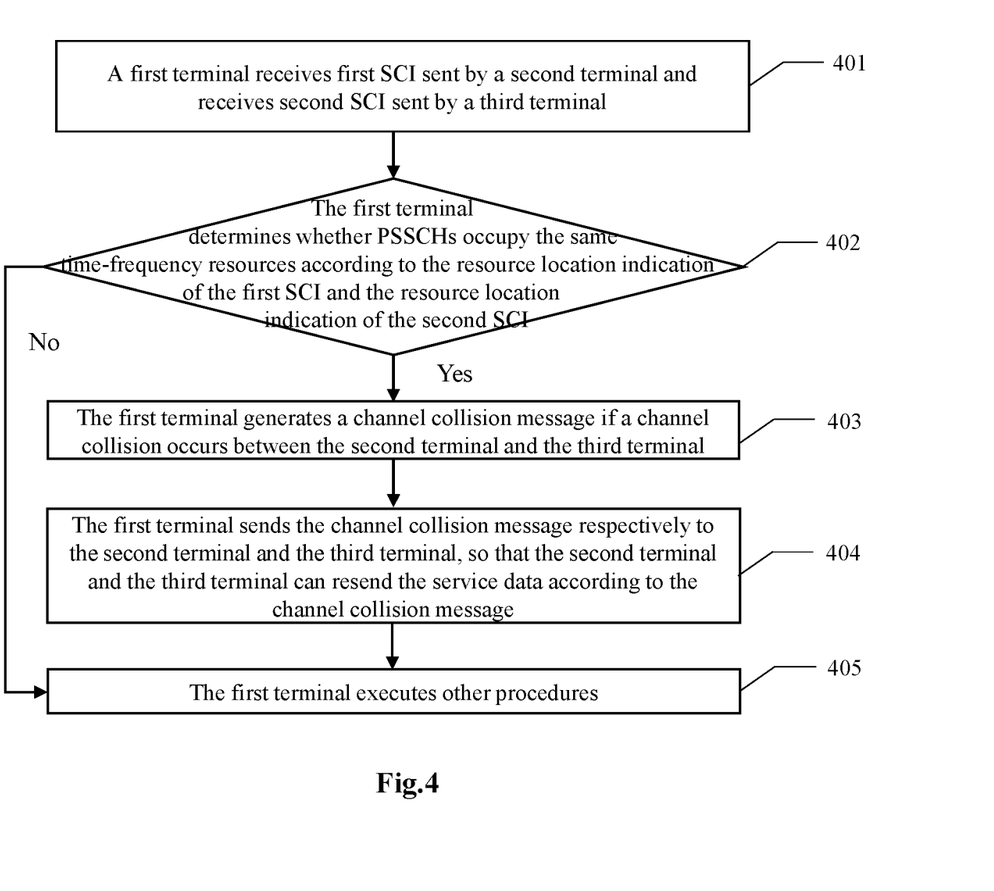
FIG. 4 is another flow diagram of a method for processing channel collisions in direct mode operation according to an embodiment of the present invention.

II. Channel Collision Among the Groups:

The following describes the method for processing channel collisions among different session groups from a first terminal side. Referring to FIG. 4, another embodiment of a method for processing channel collisions in direct mode operation according to the embodiments of the present invention comprises the following steps.

In step 401, a first terminal receives first SCI sent by a second terminal and receives second SCI sent by a third terminal.

In this embodiment, in the DMO, the first terminal and the second terminal belong to the same communication session group, while the first terminal and the third terminal belong to different communication session groups. When the second terminal sends service data and sends the first SCI, and the third terminal sends the second SCI and sends the second SCI, the first terminal may receive the first SCI and the second SCI. It can be understood that the first terminal may be any terminal of the communication session group to which the second terminal belongs.

In step 402, the first terminal determines whether PSSCHs occupy the same time-frequency resources according to the resource location indication of the first SCI and the resource location indication of the second SCI; step 403 is executed if the PSSCHs occupy the same TTI; otherwise, step 405 is executed.

Specifically, the SCI comprises a resource location indication. The resource location indication is used to indicate the TTI in which the PSSCH transmitting the service data is located, for instance, the resource location indication of the first SCI indicates that the PSSCH is located in an $x^{th}$ TTI, while the resource location indication of the second SCI indicates that the PSSCH is in a $y^{th}$ TTI; if x=y, then it indicates that the second terminal and the third terminal use the same TTI; if x≠y, it indicates that the second terminal and the third terminal use different TTIs.

The first terminal can also determine whether the PSSCHs sent by the second terminal and the third terminal are at the same frequency point according to the first SCI and the second SCI, for example, the PSSCH sent by the second terminal is at an mth frequency point, and the PSSCH sent by the third terminal is at an nth frequency point, if m=n, it indicates that the second terminal and the third terminal use the same frequency point; if m≠n, it indicates that the second terminal and the third terminal use different frequency points.

If the PSSCHs sent by the second terminal and the third terminal are in the same TTI and at the same frequency point, then it is determined that the second terminal and the third terminal occupy the same time-frequency resource to send the service data, and a channel collision occurs between the second terminal and the third terminal, and step 403 is executed. If the PSSCHs sent by the second terminal and the third terminal are in different TTIs or at different frequency points, then it indicates that no channel collision occurs between the second terminal and the third terminal, and it is not necessary to resend the service data, and step 405 is executed.

In step 403, the first terminal generates a channel collision message if a channel collision occurs between the second terminal and the third terminal.

In step 404, the first terminal sends the channel collision message respectively to the second terminal and the third terminal, so that the second terminal and the third terminal can resend the service data according to the channel collision message.

In step 405, the first terminal executes other procedures.

Step 403 to step 405 are similar to step 203 to step 205, and will not be elaborated herein.

In this embodiment, when channel collisions occur among the terminals in different communication session groups, the first terminal can send a channel collision message, and the terminals having the channel collision can resend the service data according to the channel collision message, which ensures correct transmission of the service data, and improves user experience.

Optionally, in some embodiments of the present invention, the method further comprise that: the first terminal receives the service data sent by the second terminal; after the determining, by the first terminal that a channel collision occurs between the second terminal and the third terminal, the method comprises: the steps of determining, by the first terminal, whether the service data is correct, and triggering the first terminal to generate a channel collision message if the service data is incorrect.

In this embodiment, the second terminal and the third terminal belong to different communication session groups. When geographic locations of the second terminal and the third terminal are far away from each other, in the meanwhile, since the channels themselves have certain orthogonality, and in the case that the time-frequency resource occupied by the second terminal to send the service data to the first terminal and the time-frequency resource occupied by the third terminal to send the service data are the same, it is still possible for the second terminal to send the service data to the first terminal correctly. The first terminal may determine whether the service data sent by the second terminal is correct; if the service data is incorrect, it indicates that the same time-frequency used by the third terminal to send the service data causes the second terminal to fail to send the service data, and the second terminal needs the steps of resending the service data, and triggering the first terminal to generate a channel collision message; if the service data is correct, it indicates that the third terminal sends the service data without affecting the second terminal to send the service data to the first terminal, and the channel collision message may not be generated. Specifically, the first terminal may perform cyclic redundancy check on the service data. If the check fails, then the service data is determined to be incorrect. If the check is passed, then the service data is determined to be correct.

When a channel collision occurs between the second terminal and the third terminal in different communication session groups to cause the first terminal to fail to acquire the service data correctly, the second terminal may resend the service data to the first terminal, which solves the problem that the first terminal cannot receive the service data correctly, and improves user experience.

It should be noted that, the step of determining, by the first terminal, whether the service data is correct may also be executed before the first terminal determines whether a channel collision occurs between the second terminal and the third terminal.

Figure 5:
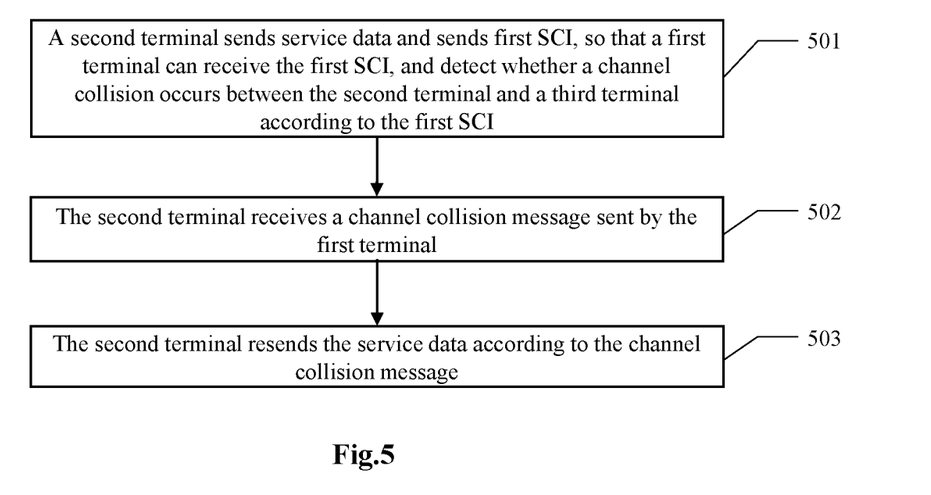
FIG. 5 is another flow diagram of a method for processing channel collisions in direct mode operation according to an embodiment of the present invention.

The following describes the method for processing channel collisions among different communication session groups from a second terminal side. Referring to FIG. 5, another embodiment of a method for processing channel collisions in direct mode operation according to the embodiments of the present invention comprises the following steps.

In step 501, a second terminal sends service data and sends first SCI, so that a first terminal can receive the first SCI, and detect whether a channel collision occurs between the second terminal and a third terminal according to the first SCI.

In this embodiment, in the DMO, the first terminal and the second terminal belong to the same communication session group, while the second terminal and the third terminal belong to different communication session groups. The second terminal sends service data and sends the first SCI, the third terminal sends service data and sends the second SCI, the first terminal can receive the first SCI and the second SCI, and detect whether a channel collision occurs between the second terminal and the third terminal according to the first SCI and the second SCI; if a channel collision occurs between the second terminal and the third terminal, then step 502 is executed; otherwise, other procedures are executed.

The first terminal, the second terminal, and the third terminal respectively belong to different communication session groups. For example, the third terminal belongs to a communication session group 2, while the first terminal and the second terminal belong to a communication session group 1. The first terminal can distinguish the terminals in the communication session groups and the terminals outside the communication session groups according to the session group ID (Group ID) in the SCI information.

In step 502, the second terminal receives a channel collision message sent by the first terminal.

When a channel collision occurs between the second terminal and the third terminal, the second terminal can receive the channel collision message sent by the first terminal.

In step 503, the second terminal resends the service data according to the channel collision message.

Step 502 to step 503 are similar to step 302 to step 303, and will not be elaborated herein.

In this embodiment, when a channel collision occurs between the second terminal and the third terminal in different communication session groups, the second terminal can resend the service data according to the channel collision message, thereby improving the implementing feasibility of the solution.

Optionally, in some embodiments of the present invention, after the second terminal receives the channel collision message sent by the first terminal, the method further comprises: the steps of determining, by the second terminal, whether a channel collision occurs between the second terminal and the third terminal according to the channel collision message, and triggering the second terminal to resend the service data according to the channel collision message if the channel collision occurs.

Optionally, in some embodiments of the present invention, after the second terminal receives the channel collision message sent by the first terminal, the method further comprises: the steps of determining, by the second terminal, whether the second terminal satisfies a pause condition, and acquiring a pause duration if the second terminal satisfies the pause condition, and starting timing from receiving the channel collision message; when the timing reaches the pause duration, triggering the second terminal to resend the service data according to the channel collision message, and triggering the second terminal to resend service data according to the channel collision message if the second terminal does not satisfy the pause condition.

Further, in some embodiments of the present invention, the determining, by the second terminal, whether the second terminal satisfies a pause condition comprises that: the second terminal determines whether the priority of the second terminal is lower than a preset priority, and determines that the second terminal satisfies the pause condition if the priority of the second terminal is lower than the preset priority.

Or, in some embodiments of the present invention, the second terminal acquires the pause duration according to the priority of the terminal.

Further, in some embodiments of the present invention, the, acquiring, by the second terminal, a pause duration comprises that: the second terminal acquire the pause duration according to a random algorithm. Specifically, the pause duration may be 1s, 2s or other time values, which are not specifically limited herein.

Optionally, in some embodiments of the present invention, the second terminal may resend the service data according to the channel collision message specifically in the following manner: the second terminal selects an idle frequency point to resend the service data according to the channel collision message.

Optionally, in some embodiments of the present invention, the second terminal may send the service data specifically in the following manner: the second terminal sends the service data to the first terminal.

Specifically, the second terminal sends the service data to the first terminal, and the first terminal can determine whether the service data is correct. The determination manner may be through cyclic redundancy check or other determination manner, which will not be limited herein.

It should be noted that, the foregoing optional embodiment is similar to the optional embodiment shown in FIG. 3, and will not be elaborated herein.

For ease of understanding, a specific application scenario is used hereinafter to describe another method for processing channel collisions according to the embodiments of the present invention in details.

The terminal 1 and the terminal 2 belong to the communication session group 1, and both the terminal 3 and the terminal 4 belong to the communication session group 2. The terminal 1 is in DMO communication with the terminal 2, and the terminal 3 is in DMO communication with the terminal 4.

The terminal 2 sends SCI01 and PSSCH1 to the terminal 1, and the terminal 3 sends SCI02 and PSSCH2 to the terminal 4.

The terminal 1 can determine whether the PSSCH1 and the PSSCH2 are in the same TTI according to the resource location indication of the SCI01 and the SCI02; assuming that the PSSCH1 is in a 6th TTI, and the PSSCH2 is in an 8th TTI, then it is determined that no channel collision occurs between the terminal 2 and the terminal 3.

When both the PSSCH1 and the PSSCH2 are in the sixth TTI, and both the PSSCH1 and the PSSCH2 are sent at a frequency point 1, it indicates that the PSSCH1 and the PSSCH2 occupy the same time-frequency resources, and the terminal 2 and the terminal 3 may possibly not be able to correctly send service data. The terminal 1 performs cyclic redundancy check on the service data sent by the terminal 2. If the check is passed, it indicates that the terminals using the same time-frequency resources above do not affect to send the service data. If the check fails, then it is determined that a channel collision occurs between the terminal 2 and the terminal 3, and the two terminals cannot send the service data correctly. The terminal 1 broadcasts a channel collision message. Taking ERR1 as an example, the terminal 2 and the terminal 3 acquire pause durations T1 and T2 respectively after receiving the ERR1. When the timing reaches T1, the terminal 2 sends the service data to the terminal 1. When the timing reaches T2, the terminal 3 sends the service data to the terminal 4. By staggering the time of sending service data, the problem that the terminal 1 cannot receive the service data correctly due to channel collision is resolved and the user experience is improved.

It should be noted that the specific procedure of processing the channel collision by the terminal 4 is similar to the processing procedure of the terminal 1. If there are terminals 5 and 6 or other terminals in other communication session groups which cause a channel collision during DMO communications, the specific procedure of processing the channel collision is similar to that of the terminal 1 and will not be elaborated herein.

The above describes the method for processing channel collisions in direct mode operation according to the embodiments of the present invention from the perspective of method, and the following describes the terminal according to the embodiments of the present invention from the perspective of apparatus.

Figure 6:
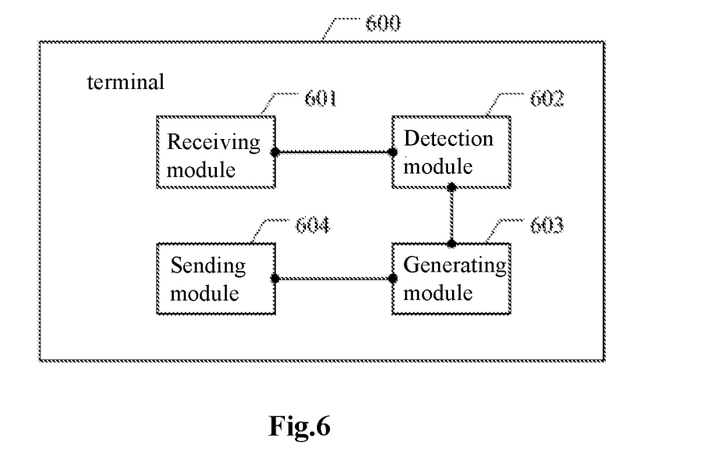
FIG. 6 is a structural diagram of a terminal according to an embodiment of the present invention.

The following describes a terminal 600 as a first terminal. Referring to FIG. 6, an embodiment of the terminal according to the embodiments of the present invention comprises:

a receiving module 601, configured to receive first SCI sent by a second terminal and second SCI sent by a third terminal;

a detection module 602, configured to detect whether a channel collision occurs between the second terminal and the third terminal according to the first SCI and the second SCI;

a generating module 603, configured to generate a channel collision message if a channel collision occurs between the second terminal and the third terminal; and a sending module 604, configured to send the channel collision message, so that the second terminal and the third terminal can resend the service data according to the channel collision message.

Optionally, in some embodiments of the present invention, the detection module 602 is specifically configured to determine whether physical sidelink shared channels PSSCHs are in the same transmission time interval TTI according to the resource location indication of the first SCI and the resource location indication of the second SCI, and determine that a channel collision occurs between the second terminal and the third terminal if the PSSCHs are in the same transmission time interval TTI, wherein the first terminal, the second terminal and the third terminal belong to the same communication session group.

Optionally, in some embodiments of the present invention, the detection module 602 is specifically configured to determine whether PSSCHs occupy the same time-frequency resources according to the resource location indication of the first SCI and the resource location indication of the second SCI, and determine that a channel collision occurs between the second terminal and the third terminal if the PSSCHs occupy the same time-frequency resources, wherein the first terminal and the second terminal belong to the same communication session group, and the first terminal and the third terminal belong to different communication session groups.

Optionally, in some embodiments of the present invention, the receiving module 601 is further configured to receive service data sent by the second terminal;

the detection module 602 is further configured to the steps of, determining whether the service data is correct after the detection module 602 determines that a channel collision occurs between the second terminal and the third terminal, and triggering the generating module 603 to generate a channel collision message if the service data is incorrect.

Optionally, in some embodiments of the present invention, the sending module 604 is specifically configured to send the channel collision message in a broadcast manner, the channel collision message comprising a second terminal identification and a third terminal identification; and/or, the sending module 604 is specifically configured to send the channel collision message to the second terminal and the third terminal respectively in a point to point P2P manner.

Figure 7:
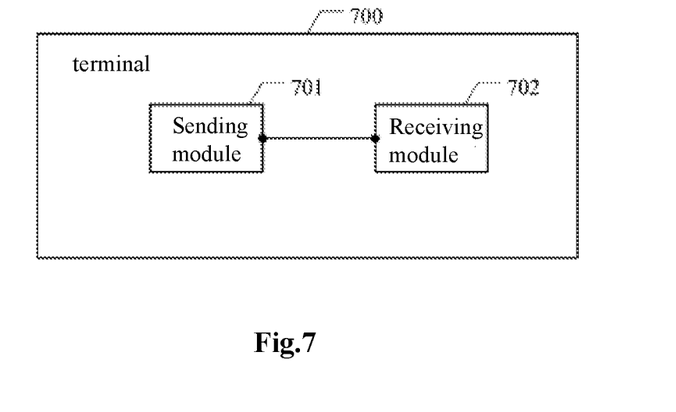
FIG. 7 is another structural diagram of a terminal according to an embodiment of the present invention.

The following describes a terminal 700 as a second terminal. Referring to FIG. 7, another embodiment of the terminal according to the embodiments of the present invention comprises:

a sending module 701, configured to send service data and send first sidelink control information SCI, so that a first terminal can receive the first SCI, and detect whether a channel collision occurs between the second terminal and a third terminal according to the first SCI; and a receiving module 702, configured to receive a channel collision message sent by the first terminal;

wherein, the sending module 703 is further configured to resend the service data according to the channel collision message.

Figure 8:
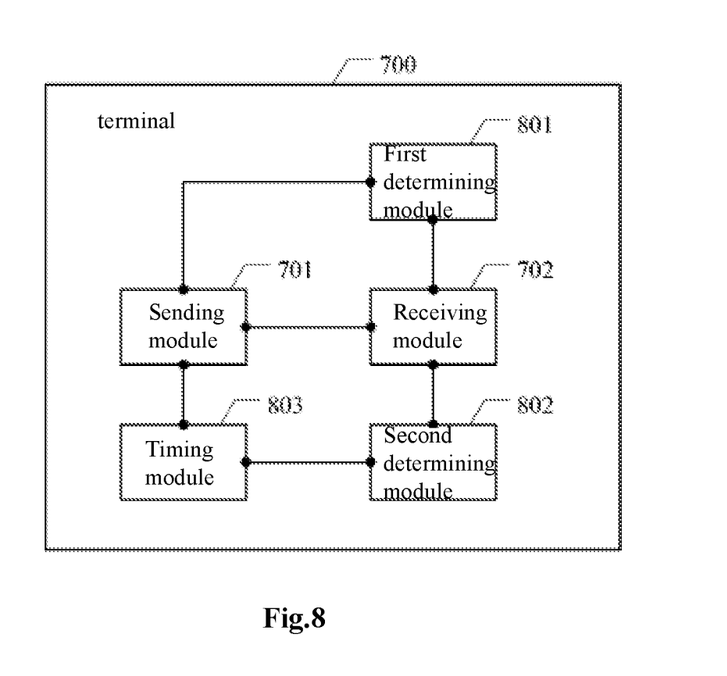
FIG. 8 is another structural diagram of a terminal according to an embodiment of the present invention.

Please referring to FIG. 8, optionally, in some embodiments of the present invention, the terminal 700 further comprises:

a first determining module 801 configured to the steps of determining whether a channel collision occurs between the second terminal and the third terminal according to the channel collision message, and triggering the sending module to resend the service data according to the channel collision message if the channel collision occurs.

Optionally, in some embodiments of the present invention, the terminal further comprises:

a second determining module 802 configured to the steps of determining whether the second terminal satisfies a pause condition, and triggering a timing module 803 to acquire a pause duration if the second terminal satisfies the pause condition, and starting timing from receiving the channel collision message; when the timing reaches the pause duration, triggering the sending module 701 to resend the service data according to the channel collision message, and triggering the sending module 701 to resend the service data according to the channel collision message if the second terminal does not satisfy the pause condition; and the timing module 803 is configured to acquire the pause duration and start timing from receiving the channel collision message.

Optionally, in some embodiments of the present invention, the second determining module 802 is specifically configured to determine whether a priority of the second terminal is lower than a preset priority, and determine that the second terminal satisfies the pause condition if the priority of the second terminal is lower than the preset priority.

Optionally, in some embodiments of the present invention, the timing module 803 is specifically configured to acquire a pause duration according to a random algorithm;

or, the timing module 803 is specifically configured to acquire the pause duration according to the priority of the terminal.

For ease of understanding, a specific application scenario is used hereinafter to describe the interaction between various modules of the terminal according to the embodiments of the present invention in detail.

The terminal 1, the terminal 2 and the terminal 3 all belong to the same session group. When the sending module 701 sends a PSSCH1, SCI01 is broadcast. When the third terminal sends a PSSCH2, SCI02 is broadcast. The receiving module 601 can receive the SCI01 and the SCI02. The detection module 602 can determine whether the PSSCH1 and the PSSCH2 are in the same TTI according to the resource location indication of the SCI01 and the resource location indication of the SCI02. Assuming that the PSSCH1 is in a sixth TTI and the PSSCH2 is in an eighth TTI, and then the detection module determines that no channel collision occurs between the terminal 2 and the terminal 3.

When both the PSSCH1 and the PSSCH2 are sent in the sixth TTI, the detection module 603 determines that a channel collision occurs between the terminal 2 and the terminal 3, and none of the terminals can send the service data correctly. The generating module 603 can generate a channel collision message, and the sending module 604 broadcasts the channel collision message. Taking ERR1 as an example, after the receiving module 702 receives ERR1, the first determining module 801 determines whether a channel collision occurs between the terminal 2 and the terminal 3. If a channel collision occurs between the terminal 2 and the terminal 3, the second determining module 802 determines whether the terminal 2 satisfies a pause condition, and if the terminal 2 satisfies the pause condition, the timing module 803 acquires a pause duration T1. When the timing reaches T1, the sending module 701 sends the service data, and the terminal 3 acquires a pause duration T2. When the timing reaches T2, the terminal 3 sends the service data, so that the channel collisions are solved by staggering the service data sending time, thus improving user experience.

It should be noted that the interaction between the modules of the terminal 3 is similar to that of the terminal 2, and reference may be made to the embodiment shown in FIG. 7, or FIG. 8, or optional embodiments, and will not be elaborated herein.

The above describes the terminal according to the embodiments of the present invention from the perspective of unit module, and the following describes the terminal according to the embodiments of the present invention from the perspective of hardware apparatus.

Figure 9:
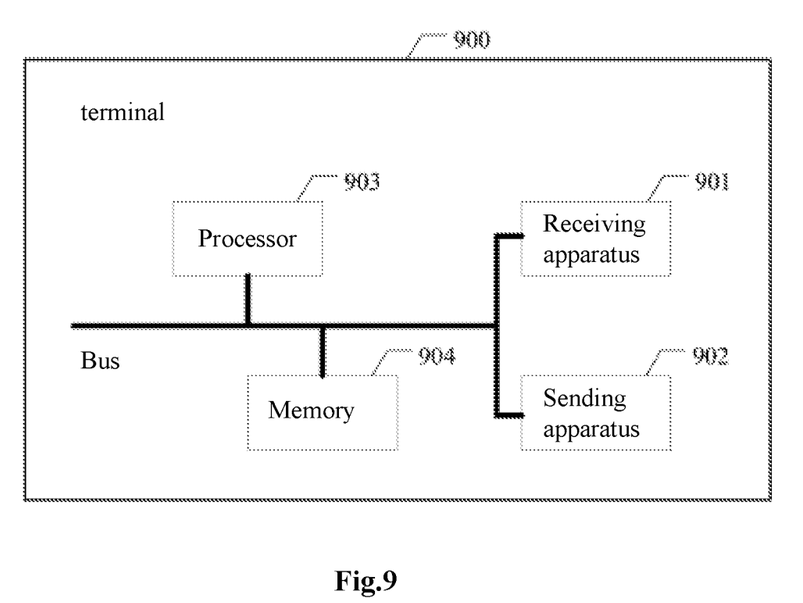
FIG. 9 is another structural diagram of a terminal according to an embodiment of the present invention.

The embodiments of the present invention also provide a hardware structure of a terminal. Referring to FIG. 9, the terminal comprises: at least one receiving apparatus 901, at least one sending apparatus 902, at least one processor 903, and a memory 904, wherein the receiving apparatus 901, the sending apparatus 902, the processor 903, and the memory 904 are connected through a bus. In FIG. 9, one receiving apparatus 901, one sending apparatus 902, one processor 903 and one memory 904 are taken for example.

The receiving apparatus 901 is configured to receive data and control instructions;

the sending apparatus 902 is configured to send data and control instructions; and the processor 903 is configured to execute a memory-stored program. Specifically, the processor may be a central processing unit (Central Processing Unit, CPU), or an application specific integrated circuit (Application Specific Integrated Circuit, ASIC), or one or more integrated circuits configured to implement the embodiments of the present invention.

The memory 904 is configured to store programs and instructions. Specifically, the programs may comprise program codes, and the above program codes comprise computer operation instructions. The memory may include a high-speed RAM memory, and may also include a non-volatile memory (Non-Volatile Memory), for instance, at least one disk storage.

The following describes the terminal according to the embodiments of the present invention as a first terminal in detail in conjunction with hardware. Referring to FIG. 9, an embodiment of the terminal according to the embodiments comprises:

a receiving apparatus 901, a sending apparatus 902, a processor 903 and a memory 904, wherein the processor 903 and the memory 904 receive external information of the terminal through the receiving apparatus 901, while the processor 903 and the memory 904 send the information outside the terminal through the sending apparatus 902.

The receiving apparatus 901 is configured to receive first SCI sent by a second terminal and second SCI sent by a third terminal;

the processor 903 is configured to detect whether a channel collision occurs between the second terminal and the third terminal according to the first SCI and the second SCI;

the processor 903 is further configured to generate a channel collision message if a channel collision occurs between the second terminal and the third terminal; and the sending apparatus 902 is configured to send the channel collision message, so that the second terminal and the third terminal can resend the service data according to the channel collision message.

The processor 903 is specifically configured to determine whether PSSCHs are in the same transmission time interval TTI according to the resource location indication of the first SCI and the resource location indication of the second SCI, and determine that a channel collision occurs between the second terminal and the third terminal if the PSSCHs are in the same transmission time interval TTI, wherein the first terminal, the second terminal and the third terminal belong to the same communication session group.

The processor 903 is specifically configured to determine whether PSSCHs occupy the same time-frequency resources according to the resource location indication of the first SCI and the resource location indication of the second SCI, and determine that a channel collision occurs between the second terminal and the third terminal if the PSSCHs occupy the same time-frequency resources, wherein the first terminal and the second terminal belong to the same communication session group, and the first terminal and the third terminal belong to different communication session groups.

The receiving apparatus 901 is further configured to receive service data sent by the second terminal; and the processor 903 is specifically configured to the steps of, determining whether the service data is correct after the processor 903 determines that a channel collision occurs between the second terminal and the third terminal, and triggering the processor 903 to generate a channel collision message if the service data is incorrect.

The sending apparatus 902 is specifically configured to send the channel collision message in a broadcast manner, the channel collision message including a second terminal identification and a third terminal identification; and/or, the sending apparatus 902 is specifically configured to send the channel collision message to the second terminal and the third terminal respectively in a point to point P2P manner.

Referring to FIG. 9, the following describes a terminal as a second terminal. Another embodiment of the terminal according to the embodiments of the present invention comprises:

a receiving apparatus 901, a sending device 902, a processor 903 and a memory 904.

The sending apparatus 902 is configured to send service data and send first SCI, so that a first terminal can receive the first SCI, and detect whether a channel collision occurs between the second terminal and the third terminal according to the first SCI;

the receiving apparatus 901 is configured to receive a channel collision message sent by the first terminal; and the sending apparatus 902 is further configured to resend the service data according to the channel collision message.

The processor 903 is further configured to the steps of determining whether a channel collision occurs between the second terminal and the third terminal according to the channel collision message, and triggering the sending apparatus to resend the service data according to the channel collision message if the channel collision occurs.

The processor 903 is further configured to the steps of determining whether the second terminal satisfies a pause condition, and triggering the processor 903 to acquire a pause duration if the second terminal satisfies the pause condition, and starting timing from receiving the channel collision message; when the timing reaches the pause duration, triggering the sending apparatus 902 to resend the service data according to the channel collision message, and triggering the sending apparatus 902 to resend the service data according to the channel collision message if the second terminal does not satisfy the pause condition.

The processor 903 is further configured to acquire the pause duration and start timing from receiving the channel collision message.

The processor 903 is specifically configured to determine whether a priority of the second terminal is lower than a preset priority, and determine that the second terminal satisfies the pause condition if the priority of the second terminal is lower than the preset priority.

The processor 903 is specifically configured to acquire the pause duration according to terminal random algorithm; or, the processor 903 is specifically configured to acquire the pause duration according to the priority of the terminal.

Those skilled in the art can clearly understand that, for convenience and brevity of description, the specific working processes of the above-described systems, apparatuses, and units may refer to the corresponding processes in the foregoing method embodiments, and will not be elaborated herein.

In the several embodiments provided in the present application, it should be understood that the disclosed systems, apparatuses and methods may be implemented in other ways. For example, the apparatus embodiments described above are merely illustrative. For example, the division of the units is only one logical function division. In practice, there may be another division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separation parts may or may not be physically separated, and the parts displayed as units may or may not be physical units, that is, may be located in one place, or may be distributed on multiple network units. Some or all of the units may be selected according to actual needs to achieve the objectives of the solutions in the embodiments.

In addition, each functional unit in each embodiment of the present invention may be integrated in one processing unit, or each unit may exist alone physically, or two or more units may be integrated in one unit. The integrated units above may be implemented in the form of hardware, or in the form of software functional units.

The integrated units may also be stored in a computer-readable storage medium if being implemented in the form of a software functional module and sold or used as an independent product. Based on such understanding, the essence of the technical solutions of the present invention, or the part contributing to the prior art or all or a part of the technical solutions, may be embodied in the form of a software product which is stored in a storage medium including a number of instructions such that a computer device (which may be a personal computer, a server, or a network device, etc.) performs all or a part of steps of the method described in each of the embodiments of the present invention. The foregoing storage medium comprises: any medium that is capable of storing program codes such as a USB disk, a mobile hard disk, a read only memory (ROM, Read-Only Memory), a random access memory (RAM, Random Access Memory), a magnetic disk or an optical disk, and the like.

As mentioned above, the above embodiments are only used to illustrate the technical solution of the invention, rather than limiting the invention; although the invention has been described in detail with reference to the foregoing embodiments, those with ordinary skills in the art should understand that: the technical solutions described in the foregoing embodiments can be still modified or some of the technical features can be equivalently replaced; however, these modifications or substitutions shall not depart from the spirit and scope of the technical solutions of the embodiments of the invention.

The invention claimed is:

1. A method for processing channel collisions in direct mode operation, comprising: receiving, by a first terminal, first sidelink control information (SCI) sent by a second terminal and second SCI sent by a third terminal; detecting, by the first terminal, whether a channel collision occurs between the second terminal and the third terminal according to the first SCI and the second SCI; and when the channel collision occurs between the second terminal and the third terminal, generating, by the first terminal, a channel collision message and sending the channel collision message to the second terminal and the third terminal, wherein the second terminal and the third terminal resend service data after receiving the channel collision message.

2. The method according to claim 1, wherein the detecting, by the first terminal, whether the channel collision occurs between the second terminal and the third terminal according to the first SCI and the second SCI comprises: determining, by the first terminal, whether physical sidelink shared channels (PSSCHs) are in a same transmission time interval (TTI) according to a resource location indication of the first SCI and a resource location indication of the second SCI, and determining that the channel collision occurs between the second terminal and the third terminal if the PSSCHs are in the same TTI, wherein the first terminal, the second terminal and the third terminal belong to a same communication session group.

3. The method according to claim 1, wherein the detecting, by the first terminal, whether the channel collision occurs between the second terminal and the third terminal according to the first SCI and the second SCI comprises: determining, by the first terminal, whether PSSCHs occupy same time-frequency resources according to a resource location indication of the first SCI and a resource location indication of the second SCI, and determining that the channel collision occurs between the second terminal and the third terminal if the PSSCHs occupy the same time-frequency resources, wherein the first terminal and the second terminal belong to a same communication session group, and the first terminal and the third terminal belong to different communication session groups.

4. The method according to claim 3, further comprising: receiving, by the first terminal, service data sent by the second terminal; wherein, after the determining, by the first terminal that the channel collision occurs between the second terminal and the third terminal, the method comprises the steps of: determining, by the first terminal, whether the service data is correct, and triggering the first terminal to generate the channel collision message if the service data is incorrect.

5. The method according to claim 1, wherein the sending, by the first terminal, the channel collision message comprises: sending, by the first terminal, the channel collision message in a broadcast manner, the channel collision message comprising a second terminal identification and a third terminal identification; or, sending, by the first terminal, the channel collision message to the second terminal and the third terminal respectively in a point to point (P2P) manner.

6. The method according to claim 2, wherein the sending, by the first terminal, the channel collision message comprises: sending, by the first terminal, the channel collision message in a broadcast manner, the channel collision message comprising a second terminal identification and a third terminal identification; or, sending, by the first terminal, the channel collision message to the second terminal and the third terminal respectively in a point to point (P2P) manner.

7. The method according to claim 3, wherein the sending, by the first terminal, the channel collision message comprises: sending, by the first terminal, the channel collision message in a broadcast manner, the channel collision message comprising a second terminal identification and a third terminal identification; or, sending, by the first terminal, the channel collision message to the second terminal and the third terminal respectively in a point to point (P2P) manner.

8. The method according to claim 4, wherein the sending, by the first terminal, the channel collision message comprises: sending, by the first terminal, the channel collision message in a broadcast manner, the channel collision message comprising a second terminal identification and a third terminal identification; or, sending, by the first terminal, the channel collision message to the second terminal and the third terminal respectively in a point to point (P2P) manner.

9. A terminal, wherein the terminal serves as a first terminal, and the terminal comprises: a receiving module, configured to receive first sidelink control information (SCI) sent by a second terminal and second SCI sent by a third terminal; a detection module, configured to detect whether a channel collision occurs between the second terminal and the third terminal according to the first SCI and the second SCI; a generating module, configured to generate a channel collision message when the channel collision occurs between the second terminal and the third terminal; and a sending module, configured to send the channel collision message to the second terminal and the third terminal, wherein the second terminal and the third terminal resend service data after receiving the channel collision message.

10. A terminal, wherein the terminal serves as a first terminal, and the terminal comprises: a receiving apparatus, a sending apparatus, a processor and a memory; the receiving module is configured to receive first sidelink control information (SCI) sent by a second terminal and second SCI sent by a third terminal; the processor is configured to detect whether a channel collision occurs between the second terminal and the third terminal according to the first SCI and the second SCI; the processor is further configured to generate a channel collision message when the channel collision occurs between the second terminal and the third terminal; and the sending apparatus is configured to send the channel collision message to the second terminal and the third terminal, wherein the second terminal and the third terminal resend service data after receiving the channel collision message.

11. The terminal according to claim 10, wherein the processor is specifically configured to determine whether physical sidelink shared channels (PSSCHs) are in a same transmission time interval (TTI) according to a resource location indication of the first SCI and a resource location indication of the second SCI, and determine that the channel collision occurs between the second terminal and the third terminal if the PSSCHs are in a same TTI, wherein the first terminal, the second terminal and the third terminal belong to a same communication session group.

12. The terminal according to claim 10, wherein the processor is specifically configured to determine whether PSSCHs occupy same time-frequency resources according to a resource location indication of the first SCI and a resource location indication of the second SCI, and determine that the channel collision occurs between the second terminal and the third terminal if the PSSCHs occupy the same time-frequency resources, wherein the first terminal and the second terminal belong to a same communication session group, and the first terminal and the third terminal belong to different communication session groups.

13. The terminal according to claim 12, wherein the receiving apparatus is further configured to receive service data sent by the second terminal; and the processor is specifically configured to the steps of determining whether the service data is correct after the processor determines that the channel collision occurs between the second terminal and the third terminal, and triggering the processor to generate the channel collision message if the service data is incorrect.

14. The terminal according to claim 10, wherein the sending apparatus is specifically configured to send the channel collision message in a broadcast manner, the channel collision message comprising a second terminal identification and a third terminal identification; or, the sending apparatus is specifically configured to send the channel collision message to the second terminal and the third terminal respectively in a point to point (P2P) manner.

15. The terminal according to claim 11, wherein the sending apparatus is specifically configured to send the channel collision message in a broadcast manner, the channel collision message comprising a second terminal identification and a third terminal identification; or, the sending apparatus is specifically configured to send the channel collision message to the second terminal and the third terminal respectively in a point to point (P2P) manner.

16. The terminal according to claim 12, wherein the sending apparatus is specifically configured to send the channel collision message in a broadcast manner, the channel collision message comprising a second terminal identification and a third terminal identification; or, the sending apparatus is specifically configured to send the channel collision message to the second terminal and the third terminal respectively in a point to point (P2P) manner.

17. The terminal according to claim 13, wherein the sending apparatus is specifically configured to send the channel collision message in a broadcast manner, the channel collision message comprising a second terminal identification and a third terminal identification; or, the sending apparatus is specifically configured to send the channel collision message to the second terminal and the third terminal respectively in a point to point (P2P) manner.

* * * * *